3,252,501
TUBULAR EVAPORATOR OF THE EXTERNAL FILM TYPE

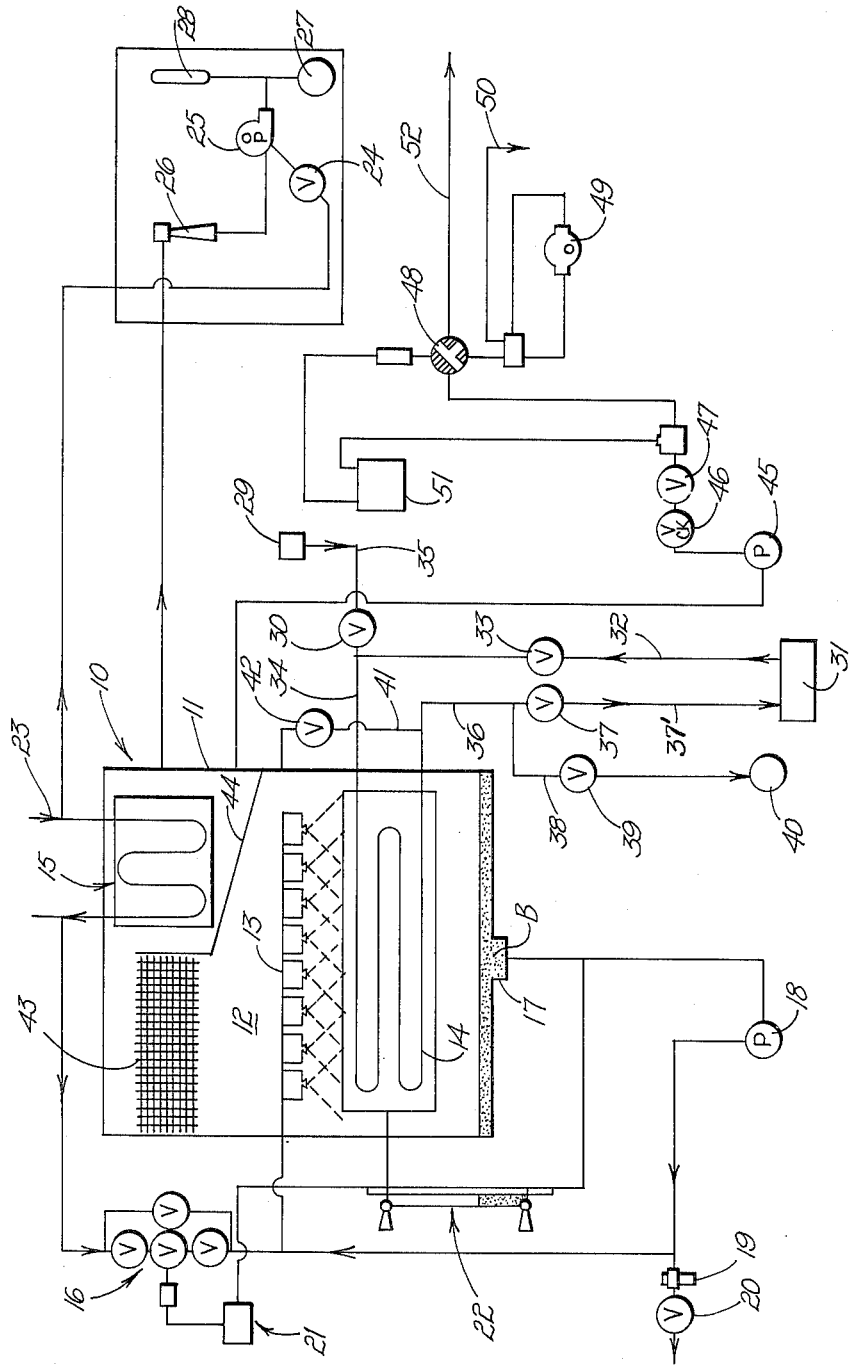

Frederick A. Loebel, Milwaukee, and Armando B. Steinbruchel, Waukesha, Wis., assignors to Aqua-Chem, Inc., a corporation of Wisconsin
Filed Dec. 21, 1962, Ser. No. 246,479
3 Claims. (Cl. 159—3)

This invention relates to evaporators and in particular to means for effecting evaporation of the feed liquid therein.

In certain installations of evaporator apparatus, sources of waste heat are available. Illustratively, in marine installations where such evaporators are utilized to produce potable fresh water from sea water, the jacket water provided for cooling engines and the like comprises a source of waste heat. The present invention comprehends the utilization of such waste heat in effecting the evaporation of liquid such as sea water within a film type evaporator wherein the feed water is flowed over the heat transfer tubes therein.

Thus, a principal feature of the present invention is the provision of a new and improved evaporation system arranged to utilize waste heat in a film type evaporator.

Another feature of the invention is the provision of such an evaporation system further including a steam supply for selectively effecting the evaporation of the feed water in the evaporator.

Still another feature of the invention is the provision of an evaporation system selectively utilizing a liquid heated by waste heat and/or steam, the system including an evaporator wherein the means conducting the liquid and/or steam causes a relatively high velocity thereof in the portion of the evaporator wherein heat transfer to the liquid to be evaporated is effected.

A further feature of the invention is the provision of such an evaporation system including means for controlling the flow of water heated by waste heat and flow of steam from the steam supply so as to provide maximum efficiency in the utilization of the available waste heat and permitting utilization of the evaporator by means of the steam supply in the event that no waste heat is available.

Other features and advantages of the invention will be apparent from the following description taken in connection with the accompanying drawing wherein the figure is a schematic flow diagram of an evaporation system embodying the invention.

In the exemplary embodiment of the invention as disclosed in the drawing, a film type evaporator generally designated 10 is shown to comprise a shell 11 defining an evaporation space 12 in which is disposed spray devices 13 arranged to spray feed water, such as sea water, downwardly onto a heat exchange tube structure 14.

The feed water is delivered through a preheater 15 and suitable control valves 16 to the spray devices 13. The brine B is recirculated from a hot well 17 in the lower portion of evaporator shell 11 through a recirculating pump 18 to the spray devices 13. A flow regulator 19 and control valve 20 are provided for delivering a portion of the brine overboard as desired. A level controller 21 and indicator 22 are connected between the valves 16 and the hot well 17 in the conventional manner.

Sea water is delivered from the feed water inlet 23 through a valve 24 to a vacuum pump 25 and the non-condensables within chamber 12 are withdrawn therefrom through a jet device 26 to vacuum pump 25 for delivery through a drain 27 as desired. A conventional silencer 28 may be associated with the drain.

The feed water sprayed onto tube structure 14 from devices 13 is evaporated as it flows in a film over the tubes by means of heat transfer to the feed water from a heat transfer fluid passed through the interior of the tubes. Herein the heat transfer fluid may comprise steam or vaporous fluid provided from a steam supply 29 through a valve 30. Alternatively, the heat transfer fluid may comprise hot water or liquid fluid heated by waste heat, herein the heat transfer fluid comprises jacket water provided for cooling an engine 31. As shown, the jacket water may be conducted from the engine through a liquid feed conducting conduit 32 provided with a flow control valve 33 to an inlet conducting conduit 34 connected to the tube 14. The steam or vaporous fluid is delivered from supply 29 through a conduit 35 having valve 30 provided therein for controlled delivery of the steam to the conduit 34. The heat transfer fluid is delivered from the heat exchange tube 14 through an outlet conducting conduit 36 having a valve 37 therein for controlling flow to a liquid feed conducting conduit 37' and to the engine 31. A condensate disposal conducting conduit 38 may be connected to the conduit 36 between valve 37 and tube 14 and provided with a valve 39 for controlling flow of condensed steam to a condensate drain 40. A conduit 41 may also be connected to conduit 36 between valve 37 and tube 14 and provided with a valve 42 for controlling flow to the chamber 12 from conduit 36. The valve 42 is opened during use of steam or vaporous fluid from the supply 29 so as to permit non-condensibles in the steam to be discharged into the chamber 12 where said non-condensibles are drawn off from the chamber 12 by the jet device 26 as described above.

The distillate produced by the evaporation of the sea water in chamber 12 passes upwardly through a demister or entrainment separator 43 to be condensed by heat exchange with the preheater 15. The resulting condensate is delivered from the condensing space 44 through a pump 45, check valve 46, control valve 47, three-way valve 48 and water meter 49 to a delivery conduit 50 which may be connected to a suitable storage means (not shown). A test panel 51 may be connected between valve 47 and three-way valve 48. A conduit 52 may be connected to three-way valve 48 for delivering non-potable condensate for suitable discharge.

As indicated briefly above, the heat exchange fluid delivered to the tube 14 may be selectively steam from supply 29 or hot water from engine 31. More specifically, the disclosed evaporation system may utilize the waste heat from the engine 31 as its primary source of heat energy utilized in the transfer to the film of water flowing over the tubes 14 for evaporation thereof in the evaporator. Thus, valve 30 may be closed while valves 33 and 37 are opened to effect the desired flow of the engine jacket water. Illustratively, the engine jacket water delivered to tube 14 may be at temperature of approximately 150° F. and the return flow from the tube 14 to the engine 31 may be at a temperature of approximately 135° F.

At certain times the engine load may be relatively low so that insufficient heat is provided to the engine jacket water to provide sufficient heat energy for operating the evaporator. At such times, the valve 30 may be concurrently opened so as to inject steam into the jacket water flowing to the tube 14 and thereby provide to the evaporator the necessary heat energy for effecting the desired evaporation. The evaporation system is further arranged for use of the evaporator 10 at such times as when the engine 31 is not operating. At such times, the valves 33 and 37 are closed and the valves 30 and 39 are opened. Thus, steam is delivered from supply 29 to tube 14 and condensed steam is delivered from the tube 14 to the condensate drain 40 for suitable disposition.

In recapitulation, the evaporation system disclosed herein as embodying the structural concepts of the present invention includes apparatus 31 producing waste heat, a source 29 of hot vaporous or first fluid, the source being constructed to utilize heat energy other than the heat energy of the waste heat to provide the hot vaporous or first fluid, an evaporator 10 having a heat exchange tube 14 and means 13 for spraying liquid to be evaporated onto the outer surface of the tube 14, inlet conducting conduit 34 connected with the inlet side of tube 14 and outlet conducting conduit 36 connected with the outlet side of tube 14, first liquid feed conducting means 37' for conducting a liquid or second fluid to the apparatus 31 to be in heat exchange relationship with said apparatus 31 to transfer waste heat to the liquid or second fluid second liquid feed conducting conduit or means 32 for conducting the heated liquid or second fluid from the apparatus 31 to said inlet conducting conduit 34 and to the tube 14 to transfer heat from the heated liquid or second fluid to the liquid on the outer surface of the tube 14, vapor feed conducting means 35 for conducting the vaporous or first fluid from the source to said inlet conducting conduit 34 and to the tube 14 to transfer heat from the vaporous or first fluid to the liquid on the outer surface of the tube 14, condensate disposal conducting conduit or means 38 for conducting vaporous condensate from said outlet conducting conduit 36 to a drain 40; and means 33, 37, 39 and 30 controlling all the conducting means 37', 32, 34, 36 and 38 for selective conduction of (a) the vaporous or first fluid alone through the vapor feed conducting conduit 35, inlet conducting conduit 34, tube 14, outlet conducting conduit 36 and condensate disposal conducting conduit 38, (b) the heated liquid or second fluid alone through the second liquid feed conducting conduit 32, the inlet conducting conduit 34, tube 14, outlet conducting conduit 36 and first liquid feed conducting conduit 37', or (c) the liquid or second fluid through the second liquid feed conducting conduit 32 to the inlet conducting conduit 34 to said tube 14 and concurrently the vaporous or first fluid through the vapor feed conducting conduit 35 to the inlet conducting conduit 34 to said tube to form a mixture with said liquid or second fluid and said mixture through the outlet conducting conduit 36 and the first liquid feed conducting conduit 37'.

Thus, the evaporation of the sea water is effected with maximum efficiency and economy. In the illustrated embodiment, the vapor within the chamber 12 may be at a temperature of approximately 110° F. and at a pressure of 2½ inches of mercury absolute, whereby the relatively low temperature heat of the engine jacket water may be efficiently utilized in the evaporation process.

The invention comprehends the utilization of waste heat in a liquid transfer medium. The evaporator 10 is adapted to utilize such a liquid heat transfer medium by virtue of the relatively high velocity of the heat transfer medium along the interior surfaces of the heat exchange tube structure 14. Thus, evaporator 10 is adapted for use both with the waste heat liquid heat exchange medium, and the steam heat exchange medium.

While the invention has been disclosed primarily in conjunction with a marine installation, it is obvious that it may be employed equally well in other applications where waste heat is available and where the feed liquid comprises liquid other than sea water.

While we have shown and described one embodiment of our invention, it is to be understood that it is capable of many modifications. Changes, therefore, in the construction and arrangement may be made without departing from the spirit and scope of the invention as defined in the appended claims.

We claim:

1. An evaporation system comprising: apparatus producing waste heat; a source of hot vaporous fluid, said source being constructed to utilize heat energy other than the heat energy of said waste heat to provide said hot vaporous fluid; an evaporator having a heat exchange tube and means for spraying liquid to be evaporated onto the outer surface of the tube; inlet conducting means connected with the inlet side of said tube and outlet conducting means connected with the outlet side of said tube; first liquid feed conducting means for conducting a liquid fluid from said outlet conducting means to said apparatus to be in heat exchange relationship with said apparatus to transfer waste heat to said liquid fluid; second liquid feed conducting means for conducting the heated liquid fluid from said apparatus to said inlet conducting means and to said tube to transfer heat from the heated liquid fluid to the liquid on the outer surface of the tube; vapor feed conducting means for conducting said vaporous fluid from said source to said inlet conducting means and to said tube to transfer heat from the vaporous fluid to the liquid on the outer surface of the tube; condensate disposal conducting means for conducting vaporous condensate from said outlet conducting means to a drain; and means controlling all said conducting means for selective conduction of (a) said vaporous fluid alone through said vapor feed conducting means, said inlet conducting means, said tube, said outlet conducting means and said condensate disposal conducting means, (b) said heated liquid fluid alone through said second liquid feed conducting means, said inlet conducting means, said tube, said outlet conducting means and said first liquid feed conducting means, or (c) said liquid fluid through said second liquid feed conducting means to said inlet conducting means to said tube and concurrently said vaporous fluid through said vapor feed conducting means to said inlet conducting means to said tube to form a mixture with said liquid fluid, and said mixture through said outlet conducting means and said first liquid feed conducting means.

2. An evaporation system comprising: apparatus producing waste heat; a source of hot vaporous fluid, said source being constructed to utilize heat energy other than the heat energy of said waste heat to provide said hot vaporous fluid; an evaporator having a heat exchange tube and means for spraying liquid to be evaporated onto the outer surface of the tube; first means for conducting a liquid fluid to said apparatus to be in heat exchange relationship with said apparatus to transfer waste heat to said liquid fluid; second means for conducting the heated liquid fluid from said apparatus to within said tube to transfer heat from the heated liquid fluid to the liquid on the outer surface of the tube; third means for conducting said vaporous fluid from said source to within said tube to transfer heat from the vaporous fluid to the liquid on the outer surface of the tube; fourth means for conducting fluid from said tube to said first means; fifth means for conducting fluid from said fourth means to a drain; and means controlling all said conducting means for selective conduction of (a) said vaporous fluid alone through said third means, tube, fourth means and fifth means, (b) said heated liquid fluid alone through said second means, tube, fourth means and first means, or (c) said liquid fluid through said second means to said tube and concurrently said vaporous fluid through said third means to said tube to form a mixture with said liquid fluid, and said mixture through said fourth means and first means.

3. An evaporation system as claimed in claim 2 wherein said evaporator has means for recirculating a portion of any unevaporated sprayed liquid for mixing with a portion of raw water which mixture is sprayed on the outer surface of said tube.

(References on following page)

References Cited by the Examiner

UNITED STATES PATENTS

| | | | |
|---|---|---|---|
| 849,579 | 4/1907 | Siebel | 159—24 |
| 1,118,041 | 11/1914 | Nobel et al. | 159—24 |
| 1,150,713 | 8/1915 | Soderlund | 159—24 |
| 1,200,996 | 10/1916 | Soderlund et al. | 159—24 |
| 2,233,321 | 2/1941 | Meurk et al. | |
| 2,577,090 | 12/1951 | Ottolenght | 159—24 X |
| 2,588,099 | 3/1952 | Farnsworth | 159—24 |
| 2,589,406 | 3/1952 | Lathan | 202—75 |
| 2,637,684 | 5/1953 | Buffum | 202—75 |
| 2,863,501 | 12/1958 | Farnsworth | 159—24 |
| 2,871,116 | 1/1959 | Clark | 159—47 X |
| 2,895,546 | 7/1959 | Sadtler | 159—24 |

NORMAN YUDKOFF, *Primary Examiner.*

GEORGE D. MITCHELL, *Examiner.*

J. SOFER, *Assistant Examiner.*